United States Patent Office 3,523,872
Patented Aug. 11, 1970

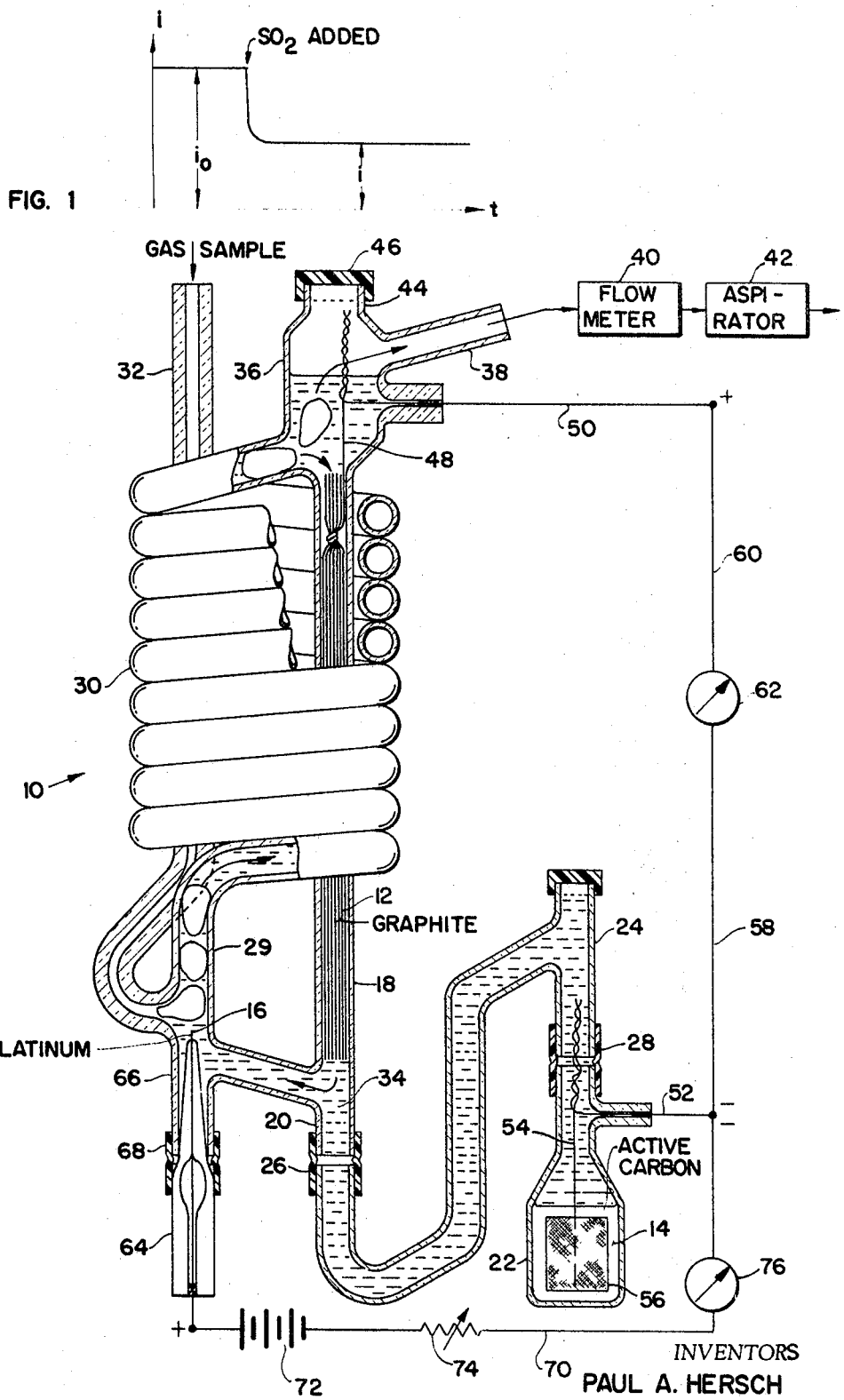

3,523,872
GAS ANALYSIS
Paul A. Hersch, Fullerton, and Rudolf Deuringer, El Toro, Calif., assignors to Beckman Instruments, Inc., a corporation of California
Filed Feb. 18, 1965, Ser. No. 433,554
Int. Cl. G01n 27/46
U.S. Cl. 204—1                                                   18 Claims

ABSTRACT OF THE DISCLOSURE

An electrochemical process and apparatus for continuously monitoring reduced species, such as $SO_2$, in a gas stream. The apparatus comprises a cell holding a halide electrolyte, means for generating a constant level of halogen and a current generating means which produces a current indicative of the level of $SO_2$ in the gas stream entering the cell. The invention is particularly suited for air pollution studies.

---

This invention relates generally to gas analysis and, more particularly, to an improved galvanic monitoring process and apparatus for the continuous analysis of traces of reducing species in gas streams.

Although the present invention shall be described in connection with the analysis of sulfur dioxide, it is to be understood that the invention applies to the determination of other species which consume free halogen such as hydrogen sulfide, mercaptans, hydrazines, aldehydes, besides olefins and, further, to the analysis of any gaseous species which reduces the level of a reagent in an aqueous electrolyte.

It is known that sulfur dioxide is one of the most aggravating irritants, if not poisoning, contaminants in air. Also, sulfur dioxide is an important corrosive constituent of stack gases, since many fuels contain sulfur. Consequently, there is a need for an inexpensive and efficient means for monitoring sulfur dioxide.

At the present time there are available manual and semi-manual methods for analyzing sulfur dioxide, most of which are based upon colorimetric processes and are only intermittent, not continuous. The few instruments which are available which operate on a continuous basis are very costly, in that they require an elaborate provision for reagent feed and drainage to and from the instrument. Still other systems require amplification and sophisticated feedback circuitry besides servomechanisms.

It is, therefore, the principal object of the present invention to provide a relatively simple method and apparatus for measuring reducing species such as sulfur dioxide continuously and at low concentration levels.

A further object of the invention is to provide a coulometric process and apparatus for determining reducing species in which there is no requirement for calibration nor for the provision of standard sources of the species for comparison.

Immediately below is presented a summary of a principal aspect of the present invention, such summary being intended to provide a ready understanding of the invention but not to serve in any way as the definition of the scope of the invention which is set forth in the appended claims. The present invention is based upon some of the principles disclosed in copending patent application entitled "Gas Analysis" by Paul A. Hersch, Ser. No. 375,421, filed June 11, 1964, now Patent No. 3,314,864, assigned to the assignee of the present application. It is disclosed in said aforementioned application that a halogen in a sample gas stream may be determined by delivering the sample stream to a galvanic measuring cell which is provided with an anode of active carbon or, in some cases silver or mercury, and a cathode of inert conductive material joined by a neutral buffered halide electrolyte. When the gas stream containing the halogen is permitted to dissolve in the electrolyte and passed over the cathode, the carbon anode is electrochemically oxidized. The free energy of oxidation of the carbon anode, coupled with the reduction of the halogen to halide, is converted into electrical energy. The current generated between the electrodes is the measure of the rate of supply of halogen and is related to this rate by Faraday's law. In order to determine $SO_2$ or other reducing species, according to the present invention, there is produced a constant level of halogen in the aforementioned cell, therefore producing a constant current output from the cell. Consequently, when a gas stream containing $SO_2$ or other reducing species enters the electrolyte of the cell, the level of halogen in the electrolyte of the cell is reduced, resulting in a change in the current produced by the measuring cell. The change in current level is an indication of the rate of entry of the reducing species into the electrolyte and, therefore, if the flow rate of the gas stream is known, the change is also an indication of the concentration of the species in the gas stream.

According to another and broader aspect of the invention, there is provided means for determining a species in a sample gas stream that reduces the level of a reagent in an aqueous electrolyte by incorporating in the cell described above a means for coulometrically generating a constant level of the reagent in the cell electrolyte. By electrolytically generating the reagent, and utilizing as one of the electrodes of the galvanic cell a bipolar material, only three electrodes are required for both producing the constant level of reagent in the cell and for galvanically determining the rate of consumption of the reagent as the result of its reaction with the reducing species in the sample gas stream. By utilizing such a system, an entirely coulometric output is provided, thus dispensing with the requirement of any calibration, standardized sources of the species being determined, reagent feeding systems and electrical feedback loops.

Other objects, aspects and advantages will become more apparent from the following description taken in connection with the accompanying drawing wherein:

FIG. 1 is a graph showing a typical recording of the output of the apparatus of the invention; and FIG. 2 is a partial sectional view of the preferred embodiment of the apparatus of the invention.

In the preferred embodiment of the invention, there are provided three electrodes in a cell joined by a neutral buffered halide electrolyte. Preferably one of the electrodes is a platinum wire; the second electrode is a bipolar electrode preferably formed of active carbon; and the third electrode is formed of an inert conductive material such as graphite (inactive carbon). A power supply is connected to the platinum wire and active carbon bipolar electrode thereby forming a coulometric generating cell for producing a constant level of free halogen in the electrolyte. The platinum wire forms the anode and the active carbon the cathode of the electrolytic cell. The active carbon electrode also forms the anode of the galvanic measuring cell and the graphite is the cathode of the latter cell.

In the method of the invention, three processes occur, namely electrolytic, chemical and galvanic, all of which are stoichiometric. In the electrolytic process, a generating current $i_0$ is impressed across the platinum wire anode and active carbon bipolar electrode resulting in the production of free halogen. The current $i_0$ must be at least equal to and preferably greater than the equivalent of the supply rate of $SO_2$ or other reducing species in the gas stream entering the apparatus. The second process is the chemical reaction in which the $SO_2$ entering the cell consumes part of the halogen produced by the electrolytic process thus leaving a residue of free halogen in the electrolyte. In the third step, the halogen residue is reduced at the graphite cathode of the galvanic cell thus entirely consuming the residue of halogen and producing a galvanic current $i$. The difference between $i_0$ and $i$ is proportional to the rate at which the $SO_2$ enters the cell electrolyte and, thus, indicative of the concentration of the $SO_2$ in the gas stream.

The chemical and electrochemical reactions taking place in the method of the invention, when the electrolyte contains iodide as the halide, may be represented as follows:

Chemical reaction:

$$SO_2 + I_2 + 2H_2O \longrightarrow H_2SO_4 + 2HI$$

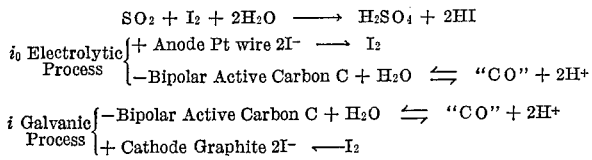

where "CO" indicates not carbon monoxide, but a surface oxide of carbon of ill-defined formula, which is reduced in the electrolytic process back to active carbon. Since all three processes, electrolytic, chemical and galvanic, are stoichiometric, a quantitative relationship rules the overall process. Applying Faraday's law, the following equation results:

$$i_0 - i = 0.134 FX \qquad (1)$$

where $F$ is the flow rate of the sample gas stream, in ml./min. (measured at 20° C. and 1 atm.) and $X$ is the concentration of the reducing species in the gas stream, in volumes per million. It is therefore seen that in the absence of $SO_2$ (when $X=0$), $i_0=i$. Thus the level of the galvanic "base line" current is identical with the electrolytic input. In other words, all of the iodine generated in the electrolytic cell is reduced back to iodide in the galvanic measuring cell or, in still other words, the electrolytic input is fully recovered as galvanic output. However, when $SO_2$ is present in the sample gas stream, part of the free iodine in the electrolyte is reduced chemically and consequently the galvanic current is depressed. The decrement $i_0 - i$ from the base line current $i_0$ represents coulometrically the rate of entry of the $SO_2$ into the cell. Thus, by merely noting the rate of flow of the gas stream through the apparatus and measuring the current decrement $i_0 - i$, a direct measurement of the concentration of the reducing species in the sample gas stream is provided. A typical recording of the output of the galvanic cell of the apparatus of the invention, in which $SO_2$ is added to a sample gas stream, is illustrated in FIG. 1.

Consequently, it is seen that by the present invention $SO_2$ or other reducing species in a sample gas stream which may reduce a halogen in an electrolyte may be continuously monitored without requiring calibration of the apparatus, comparative samples, or elaborate feedback circuitry, etc. It is known that galvanic systems of analysis can be utilized for measuring species that emerge transiently from a chromatographic separation column, and this may also hold for the present invention. In this case, a negative peak would be recorded with an area stoichiometrically related to the quantity of the transient reducent.

Referring now to FIG. 2 of the drawing, there is illustrated the preferred embodiment of the apparatus of the present invention. The three-electrode system of the preferred embodiment of the invention includes a cathode 12 of the galvanic measuring cell, a bipolar electrode 14 which constitutes the anode of the galvanic cell and the cathode of the electrolytic cell, and an anode 16 of the electrolytic cell. The cathode 12 of the galvanic measuring cell is disposed in an elongated upright section or compartment 18 which has its lower end 20 connected to a separate compartment 22 via an intermediate glass fitting 24 conected to the upright section 18 and compartment 22 by plastic sleeves 26 and 28, respectively. The upright compartment 18 of the receptacle is also connected at its upper and lower ends, respectively, to a conduit loop 29 which includes a helically formed upright gas lift or bubble chain tube 30. A sampling duct 32 in the form of a capillary tube is connected to the loop at the bottom of the gas lift tube 30 just above the anode 16 of the electrolytic cell at which the iodine is generated in the electrolyte 34 in the cell. The apparatus immediately above the junction of the gas lift tube 30 and the upper end of the upright section 18 is provided with a gas-liquid separation compartment 36 which permits the separation of the sample gas stream from the electrolyte after the $SO_2$ in the gas stream has completely reacted with the electrolyte in the gas lift tube 30. The upper end of the separation compartment 36 includes a conduit 38 which connects in series to a flowmeter 40 and an aspirator 42. The separation chamber 36 also includes a port 44 which is closed by a plastic cap 46.

The cathode 12 of the galvanic circuit may be formed of an inactive carbonaceous fibrous material, such as graphite cloth, graphite felt or graphite threads, as illustrated in FIG. 1, or may be a screen formed of noble metal, such as platinum. In the case that the cathode is formed of graphite cloth or graphite felt, such materials may be provided in the form of a scroll or porous body transversing the compartment 18. The graphite material may also be coated with a catalytically active metal such as platinum to increase the range of the cell. However, the graphite threads as illustrated in the drawing, are particularly suitable since they provide a very large surface contact with the electrolyte passing through the compartment 18. One end of a platinum wire 48 is wound about the upper portion of the graphite threads of the cathode 12 to form a tassel. The other end of wire 48 is attached to a terminal platinum wire 50 fused into the glass near the exit of the cell. The cell is sufficiently filled with the electrolyte 34 so that when the electrolyte circulates the cathode 12 is completely submerged therein.

The compartment 22 containing the bipolar electrode 14 has the shape of a bottle and carries a platinum wire 52 which traverses the glass wall of the compartment. The wire is connected to a second platinum wire 54 which is woven into a graphite cloth 56 immersed in a bed of active carbon forming the bipolar electrode 14 thus providing electrical connection between the electrode 14 and the external portion of the electric circuit. The active carbon is in the form of a sludge made by mixing finely divided active carbon with cell electrolyte. It is an essential feature of the invention that the carbon 14 be active, that is, it must participate in the chemical reaction occurring in the cell and not merely conduct electrically. Leads 58 and 60, respectively, electrically connect the platinum wires 52 and 50 to a galvanometer 62 which constitutes the means for measuring current generated in the galvanic cell, which includes the cathode 12 and bipolar electrode 14.

The active carbon forming the bipolar electrode 14 should have a large, reactive surface and the particles, when forming a bed without compression, should have enough contact with each other to ensure conductive continuity throughout the bed. The electrode 14 may also take the form of a carbonaceous fibrous material which is active, or inactive but in contact with active carbon.

It will be noted that the demand on the active carbon as a cathode (for $i_0$ in the electrolytic circuit) is balanced by the demand on it as an anode (for $i$ in the galvanic circuit) only when $SO_2$ and other reducents are absent in the gas stream. Otherwise the demand on the bipolar carbon electrode as a cathode is greater than as an anode, with the net effect that surface oxide on the carbon is consumed at the rate $i_0 - i$. Because the amount of surface oxide is not unlimited, the life of the bipolar electrode is, in principle, not unlimited. The more surface oxide the electrode is given at the beginning, the greater is the total amount of reducent the cell can absorb before ceasing to operate. In practice, the life of the bipolar electrode is many months, possibly years.

In place of the active carbon, i.e. the system surface oxide-carbon, the systems silver chloride-silver or calomel-mercury may be used. Again, unless there is no reducent in the gas, the electrolytic reduction of silver chloride will not be entirely made up for by the galvanic oxidation of the silver metal, and similarly, with the calomel-mercury system, there will be more calomel reduced to mercury than mercury re-oxidized to calomel. Therefore, as a net effect, the amount of salt will decrease and the amount of metal increase in the course of use of the cell. It is therefore advisable, in the interest of long life, to endow the cell richly with silver chloride or calomel, in intimate contact with silver or mercury, respectively. It should be noted that it is only that portion of the silver chloride or calomel which can be reached by the electrons of the external portion of the circuit that is of value.

A preferred electrolyte composition for use in the cell 10 comprises:

|  | Mol/liter of solution |
|---|---|
| NaBr | 3 |
| NaI | 0.001 |
| $NaH_2PO_4$ | 0.1 |
| $Na_2HPO_4$ | 0.1 |

The potassium salts may be replaced by the corresponding sodium or ammonium salts. The ammonium salts are more water soluble and would minimize the possibility of a salt crust forming at the site where the gas enters the bubble chain tube 30.

The purpose of the phosphates in the electrolyte is to buffer off acidity which is a product of the over-all reaction, in the presence of $SO_2$, in the cell and, more important still, a local product in the recirculating portion of the electrolyte. A slow build-up of acidity in the moving loop of electrolyte would tend to give rise to iodine from oxidation of iodide by oxygen of the air, thus leading to a parasitic current signal in the galvanic cell.

The electrolytic cell for coulometrically generating iodine in the electrolyte includes the platinum cathode 16 and the bipolar active carbon electrode 14. The cathode 16 is in the form of a platinum wire sealed in a glass tube 64 which is secured to a portion of the cell 66 depending from the bottom of the loop 29 below the gas lift tube 30. The tube 64 is secured to the depending portion 66 by means of a plastic sleeve 68. As seen in the drawing, the platinum wire 16 is disposed just below the point that the sample inlet tube 32 opens into the loop 29 so that the iodine produced by the electrolytic cell is available for immediate reaction with the reducing species in the gas stream entering the cell. The two electrolytic electrodes 14 and 16 are interconnected by a conductor 70 and the conductor 52 which meet at a node to which the lead 58 is also connected. The conductor 70 includes in series a power source 72, a variable resistor 74 and a microammeter 76. Thus the electrode 14 is connected in parallel with the electrodes 12 and 16 by the external circuitry. In the operation of this apparatus, the gas stream passing into the cell just above the generating electrode 16 of the electrolytic cell provides the pumping action necessary to cycle the electrolyte solution between the gas lift tube 30, where the reducing species in the gas stream reduces a portion of the free iodine produced by the electrolytic cell, to the cathode compartment 18 of the galvanic cell where the residue of the iodine is reduced at the graphite electrode 12. The gas passes through the duct 32 into the cell in the form of a jet breaking up to give a chain of gas bubbles in the tube 30, the bubbles being separated by short slugs of liquid as seen in FIG. 2. During the upward movement of the chain, the gas-solution interface renews itself continually and turbulently thus facilitating the complete dissolution of all $SO_2$ in the solution and, therefore, a complete reaction thereof with the iodine. The tube 30 should be of sufficient length so that when the bubbles reach the top of the tube all the $SO_2$ will be consumed by the iodine in the electrolyte. The gas stream and the liquid separate in the compartment 36, the former exits through the conduit 38 and aspirator 42 and the latter descends along the graphite cathode 12 and circulates back to the point where the gas stream enters the cell via the duct 32.

From Equation 1 above, if a stream of 500 milliliters of air per minute containing 0.01 volume per million of $SO_2$ is delivered to the cell 10, a current decrement, that is, an imbalance between the anodic input current to electrode 16 and the cathodic output current of electrode 12, of $0.134 \times 500 \times 0.01 = 0.67$ microamperes should be produced by the apparatus of the invention. At this level of $SO_2$ in the gas stream, the electrolytic current should be set at 1 or 2 microamperes to ensure that there is an excess of free iodine in the electrolyte of the cell. Numerous tests have been conducted under these conditions with virtual coulometric results being obtained, the difference between the test results and theoretical results being merely on the order of $\pm 5\%$ and often less.

Although the preferred embodiment of the invention has been described as one in which there are provided only three electrodes and one of the electrodes is bipolar, it is to be understood that reducing species such as $SO_2$ may also be determined by utilizing a separate pair of electrolytic electrodes rather than having the electrolytic system share one electrode with the galvanic system. Furthermore, it is to be understood that the constant level of free iodine produced in the cell for measuring reducing species may be provided by means other than electrolysis. For example, by removing the cap 46 from the port 44 at the upper portion of the cell and providing a facility for drainage at the bottom of the extension 66 of the cell in place of the glass tube 64, a constant flow of electrolyte containing a predetermined concentration of iodine may be delivered to the cell and after chemical and galvanic reaction drained therefrom.

The invention is also not limited merely to the monitoring of reducing species but is also applicable to the determination of any species in a gas stream which reacts with a reagent, produced by electrolysis with an electrolytic cell having an electrode common with an electrode of a galvanic measuring cell, and decreases the level of said reagent so as to result in a decrement current output in the galvanic cell.

In the measuring of $SO_2$ in air, other contaminants in the air such as ozone, may interfere with the determination of the $SO_2$. To avoid ozone error a suitable ozone scavenger may be provided in the inlet duct 32 before the sample gas stream reaches the gas lift tube 30. $NO_2$ interferes only slightly with the measurement of $SO_2$ while NO does not interfere at all. Consequently, the invention is highly suited for measuring $SO_2$ in air and also is applicable for measuring other reducing species selectively if interferents are removed.

Although several embodiments of the invention have been disclosed herein for purposes of illustration, it will be understood that various changes can be made in the form, details, materials, arrangements and proportions of the various parts in such embodiments without departing from the spirit and scope of the invention as defined by the appended claims.

What is claimed is:
1. In a monitoring process for determining a species in a sample gas stream that reduces the level of a reagent in an aqueous electrolyte, the steps comprising:
   electrolytically generating a constant level of said reagent in an aqueous electrolyte by applying a voltage across a pair of electrodes;

electrolytically measuring said constant level of reagent by measuring the current across a pair of measuring electrodes in said electrolyte, with one of said electrodes being common with one of said pair of electrolytic generating electrodes;

conveying said gas stream into said electrolyte whereby said level of reagent in said eletcrolyte is reduced, thereby changing the current across said measuring electrodes; and measuring the change in current across said measuring electrodes as a function of the rate of entry of said species in said electrolyte and, therefore, of the concentration of the species in the gas stream.

2. In a monitoring process for determining a species in a sample gas stream that reduces the level of a reagent in an aqueous electrolyte, the steps comprising:

electrolytically generating a constant level of said reagent in an aqueous electrolyte by applying a voltage across a pair of electrodes;

providing a third electrode in said electrolyte, said third electrode together with one of said pair of electrolytic generating electrodes providing a pair of measuring electrodes for generating a current as a result of the reaction of the reagent with said measuring electrodes;

conveying said gas stream into said electrolyte whereby said level of reagent in said electrolyte is reduced, thereby changing the current across the measuring electrodes; and measuring the change in current across said measuring electrodes as a function of the rate of entry of said species in said electrolyte and, therefore, of the concentration of the species in the gas stream.

3. In a continuous monitoring process for determining a species in a sample gas stream that reduces a halogen, the steps comprising:

continuously producing a constant level of free halogen in an aqueous electrolyte containing a pair of halogen measuring electrodes which generate a constant current in the absence of a change in the halogen content of the electrolyte, said level of free halogen being at least equivalent to the rate of entry of the reducing species in the sample gas stream into the electrolyte;

conveying said gas stream into said electrolyte whereby said level of free halogen is reduced by the chemical reduction of the halogen by said species and, thereby, said current is changed; and measuring the change in current across said electrodes as a function of the rate of entry of said reducing species in said electrolyte and, therefore, of the concentration of the species in the gas stream.

4. In a continuous monitoring process for determining a species in a sample gas stream that reduces a halogen, the steps comprising:

continuously electrolytically generating a constant level of free halogen in a halide electrolyte containing one electrode of inert conductive material and another electrode selected from the group consisting of active carbon, silver chloride and calomel, whereby said halogen is continuously reduced at said one electrode and a constant current is generated across said electrodes in the absence of a change in the halogen content of the electrolyte, said level of free halogen being at least equivalent to the rate of entry of the reducing species in the sample gas stream into the electrolyte;

conveying said gas stream into said electrolyte whereby said level of free halogen is reduced by the chemical reduction of the halogen by said species and, thereby, said current is changed; and measuring the change in current across said electrodes as a function of the rate of entry of said reducing species in said electrolyte and, therefore, of the concentration of the species in the gas stream.

5. In a monitoring process for determining a species in a sample gas stream that reduces a halogen, the steps comprising:

electrolytically generating a constant level of free halogen in a halide electrolyte by applying a voltage across a pair of electrodes in said electrolyte;

providing first and second measuring electrodes in said electrolyte, said first measuring electrode being selected from the group consisting of active carbon, silver chloride and calomel and said second measuring electrode being formed of inert conductive material whereby said halogen produced by said electrolytic generating process is continuously reduced at said second measuring electrode, one of such measuring electrodes being common with one of said pair of electrolytic generating electrodes;

conveying said gas stream into said electrolyte; and measuring the change in current across said measuring electrodes as a function of the rate of entry of said reducing species in said electrolyte and, therefore, of the concentration of the species in the gas stream.

6. An apparatus for continuously monitoring a species in a sample gas stream that reduces a halogen comprising:

a cell adapted to hold a halide electrolyte;

means including an inert conductive anode for continuously electrolytically generating a constant level of halogen in the electrolyte in said cell;

means in said cell for generating a current indicative of the level of halogen in the electrolyte concurrently with the generation of halogen by said first mentioned means, said means including a first current generating electrode formed of inert conductive material and a second current generating electrode formed of active carbon; and current measuring means connected to said electrodes of said current generating means.

7. An apparatus as set forth in claim 6 wherein said electrolytic generating means includes one of said current generating electrodes and a third electrode.

8. An apparatus as set forth in claim 6 including:

means for conveying a sample gas stream through electrolyte in said cell; and means for determining the flow of said gas stream through the cell.

9. An apparatus for determining a species in a sample gas stream that reduces a halogen comprising:

a cell adapted to hold a halide electrolyte;

first and second electrodes in said cell each formed of an inert conductive material;

a third electrode in said cell selected from the group consisting of active carbon, silver chloride and calomel;

circuit means including a node, a first conductor connecting said first electrode to said node, a second conductor connecting said second electrode to said node and a third conductor connecting said third electrode to said node;

electrical power source means connected to said first conductor for delivering an anodic input current to said first electrode; and said circuit means including means for connecting a current measuring means between said second and third electrodes.

10. An apparatus as set forth in claim 9 including current measuring means connected to said last-mentioned means for measuring the difference between said anodic input current and the output current of said second electrode.

11. An apparatus as set forth in claim 9 wherein said cell has a portion forming a substantially continuous closed loop allowing circulation of the electrolyte; and said loop having, in series, said first electrode, means for introducing said gas stream into said loop, a section of sufficient length to permit reduction by said species of a halogen in the electrolyte generated at said first electrode to halide, and said second electrode.

12. An apparatus as set forth in claim 11 wherein said loop includes means between said gas introducing means and said second electrode for separating the gas stream from the electrolyte in the loop; and said third electrode being in said cell remote from said loop.

13. An apparatus as set forth in claim 9 wherein said third electrode is active carbon provided as a sludge and said connecting means includes an inert conductive element in contact with said sludge.

14. An apparatus for determining a species in a sample gas stream that reduces a halogen comprising:

a cell adapted to hold a halide electrolyte, said cell including a port for introducing said sample gas stream into said electrolyte;

means for electrolytically generating a constant level of halogen in the electrolyte in said cell which level of halogen is at least equivalent to the rate of entry of the reducing species in the sample gas stream into the electrolyte;

means in said cell for generating a current indicative of the level of halogen in the electrolyte concurrently with the generating of halogen by said first mentioned means, said means including an active carbon electrode and a second electrode; and means for connecting a current measuring means to said electrodes.

15. An apparatus as set forth in claim 14 wherein said electrolytic reagent generating means includes a pair of electrodes one of which is common with one of said current generating electrodes.

16. An apparatus for determining a species in a sample gas stream that reduces a halogen comprising:

a cell adapted to hold a halide electrolyte;

means for electrolytically generating a constant level of halogen in the electrolyte in said cell;

means in said cell for generating a current indicative of the level of halogen in the electrolyte concurrently with the generating of halogen by said first mentioned means, said means including an inert conductive element in contact with a sludge of active carbon and a second inert conductive element spaced from said first element and sludge; and means for connecting a current measuring means to said elements.

17. An apparatus for determining a species in a sample gas stream that reduces a halogen comprising:

a cell adapted to hold a halide electrolyte and including inlet and outlet ports for conveying the gas stream through the electrolyte in the cell;

a pair of inert conductive electrodes and a third electrode positioned in said cell in spaced relationship, said third electrode being selected from the group consisting of active carbon, silver chloride and calomel;

circuit means connecting said third electrode in parallel with said pair of inert conductive electrodes;

electrical power source means included in said circuit means for supplying a constant continuous anodic input current to only one of said inert conductive electrodes;

current measuring means in said circuit means for indicating any unbalance between the cathodic output current of the other of said inert conductive electrodes and said anodic input current; and said circuit means being arranged so that the magnitude of said anodic input current is independent of changes in said cathodic output current.

18. An apparatus as set forth in claim 17 wherein said third electrode comprises a sludge of active carbon with an inert conductive element connecting said sludge into said circuit means.

References Cited

UNITED STATES PATENTS

| | | | |
|---|---|---|---|
| 2,851,654 | 9/1958 | Haddad | 204—195 |
| 3,179,581 | 4/1965 | Lewin et al. | 204—195 |
| 3,448,031 | 6/1969 | Robinson | 204—195 |
| 2,370,871 | 3/1945 | Marks | 204—195 |
| 3,208,926 | 9/1965 | Eckfeldt | 204—195 |
| 3,361,661 | 1/1968 | Schulze | 204—195 |
| 2,621,671 | 12/1952 | Eckfeldt | 204—195 |
| 2,651,612 | 9/1953 | Haller | 204—195 |
| 3,162,585 | 12/1964 | De Ford et al. | 204—1.1 |
| 3,234,117 | 2/1966 | Rost et al. | 204—195 |
| 3,248,309 | 4/1966 | Robinson | 204—1.1 |
| 3,236,759 | 2/1966 | Robinson | 204—195 |

OTHER REFERENCES

Sease et al., "Analytical Chemistry," vol. 19, No. 3, March 1947, pp. 197–200.

Landsberg et al., "Industrial & Engineering Chemistry," vol. 46, No. 7, July 1954, pp. 1422–1428.

TA-HSUNG TUNG, Primary Examiner

U.S. Cl. X.R.

204—195